US012355184B2

(12) United States Patent
Forget et al.

(10) Patent No.: US 12,355,184 B2
(45) Date of Patent: Jul. 8, 2025

(54) AIRCRAFT AND ELECTRICAL CONNECTOR FOR CONNECTING ELECTRICAL CONDUCTORS IN AN AIRCRAFT

(71) Applicants: Airbus (S.A.S.), Blagnac (FR); Airbus Operations GmbH, Hamburg (DE)

(72) Inventors: Frédéric Forget, Blagnac (FR); Mihai Ioan Zecheru, Hamburg (DE)

(73) Assignees: Airbus (S.A.S.), Blagnac (FR); Airbus Operations GmbH, Hamburg (DE)

( * ) Notice: Subject to any disclaimer, the term of this patent is extended or adjusted under 35 U.S.C. 154(b) by 356 days.

(21) Appl. No.: 17/984,473

(22) Filed: Nov. 10, 2022

(65) Prior Publication Data

US 2023/0155321 A1 May 18, 2023

(30) Foreign Application Priority Data

Nov. 12, 2021 (EP) .................................... 21208035

(51) Int. Cl.
*H01R 13/58* (2006.01)
*H01R 13/03* (2006.01)

(52) U.S. Cl.
CPC ......... *H01R 13/5808* (2013.01); *H01R 13/03* (2013.01); *H01R 2201/26* (2013.01)

(58) Field of Classification Search
CPC . H01R 13/5808; H01R 13/03; H01R 2201/26
(Continued)

(56) References Cited

U.S. PATENT DOCUMENTS 1,635,832 A * 7/1927 Gagnon ................. H01R 24/20 439/161
3,740,839 A * 6/1973 Otte ......................... H01R 4/62 29/830

(Continued)

FOREIGN PATENT DOCUMENTS

EP 0 105 733 A2 4/1984
EP 2 892 109 A1 7/2015

(Continued)

OTHER PUBLICATIONS

European Search Report for Application No. 21208035 dated Apr. 20, 2022.

*Primary Examiner* — Gary F Paumen
(74) *Attorney, Agent, or Firm* — KDW Firm PLLC

(57) ABSTRACT

An electrical connector for connecting electrical conductors in an aircraft includes a pin having a first contact surface and a socket to receive the pin. The socket has a second contact surface contacting a first contact surface of the pin when the pin is in the socket. A securing part is positioned to apply a contact or clamping force pressing the contact surfaces against each other. The securing part includes a shape memory alloy to exist in a martensite an austenite phase depending on temperature of the securing part, wherein the securing part assumes a first pre-set shape when the temperature is below a first temperature threshold, and a second pre-set shape when the temperature is above a second temperature threshold higher than the first temperature threshold, wherein the contact or clamping force applied by the securing part in the second pre-set shape is greater than in the first pre-set shape.

20 Claims, 10 Drawing Sheets

(58) Field of Classification Search
USPC ................................ 439/825, 161, 840, 455
See application file for complete search history.

(56) References Cited

U.S. PATENT DOCUMENTS

| | | | | | |
|---|---|---|---|---|---|
| 4,497,527 | A * | 2/1985 | Cameron | H01R 4/01 439/161 |
| 4,781,605 | A * | 11/1988 | Herubel | H01R 4/01 439/161 |
| 5,059,128 | A * | 10/1991 | Murphy | H05K 7/1084 439/708 |
| 8,851,939 | B2 * | 10/2014 | Bazenas | F16F 1/045 439/840 |
| 2019/0148865 | A1 * | 5/2019 | Zebhauser | H01R 9/0518 439/825 |

FOREIGN PATENT DOCUMENTS

| | | | |
|---|---|---|---|
| EP | 2 955 792 | A2 | 12/2015 |
| GB | 1 395 601 | A | 5/1975 |

* cited by examiner

AIRCRAFT AND ELECTRICAL CONNECTOR FOR CONNECTING ELECTRICAL CONDUCTORS IN AN AIRCRAFT

TECHNICAL FIELD

The disclosure herein pertains to an aircraft and an electrical connector for connecting electrical conductors, such as wires of a cable, in an aircraft. Although applicable for any kind of connection between electrical conductors, the disclosure herein and the corresponding underlying problems will be explained in further detail in conjunction with an aircraft.

BACKGROUND

Plug and socket connectors in which a contact pin of the plug is received in a contact recess of a socket are commonly used to connect electrical conductors. This type of connector is also used in aircrafts. Since the demand for electrical energy in aircraft applications is increasing, e.g. due to new electrical concepts for propulsion, electrical connectors are required to conduct higher electrical currents. Electrical connectors used in aircrafts, at least in some flight phases such as during take-off and landing, might be subject to vibrational loads.

Vibration of the connector may cause a variation in a contact force or clamping force by which contact surfaces of the pin and the socket are pressed against each other. Thereby, in particular, when high electrical currents flow through the contact surfaces, a phenomenon known as "contact fretting corrosion" may occur. In this context, "contact fretting corrosion" means wear of the contact surfaces, e.g. caused by local hot spots as a consequence of an increase of the electrical contact resistance due to decreased contact force during phases of high current flow. Although the connectors, typically, are not seriously damaged due to contact fretting over their lifetime, with increasing current loads applied to the connectors, there is a need to prevent damaging of the connectors.

An electrical connector of an aircraft is disclosed, for example, in EP 2 892 109 A1.

SUMMARY

It is one of the objects of the disclosure herein to provide improved solutions for electrical connectors used in aircrafts.

To this end, the disclosure herein provides an electrical connector and an aircraft as disclosed herein.

According to a first aspect of the disclosure herein, an electrical connector for connecting electrical conductors in an aircraft includes a pin having a first contact surface, a socket configured to receive the pin, the socket having a second contact surface that is in contact with first contact surface of the pin when the pin is received in the socket, and a securing part that is made of a shape memory alloy configured to exist in a martensite phase and an austenite phase depending on a temperature of the securing part, wherein to the securing part assumes a first pre-set shape when the temperature of the securing part is below a first temperature threshold, and a second pre-set shape when the temperature of the securing part is above a second temperature threshold higher than the first temperature threshold. The securing part is positioned such that it, at least when assuming the second pre-set shape, applies a contact or clamping force that presses the first and second contact surfaces against each other when the pin is received in the socket, wherein the clamping force applied by the securing part in the second pre-set shape is greater than in the first pre-set shape.

According to a second aspect of the disclosure herein, an aircraft includes a connector according to the first aspect of the disclosure herein, a first electrical conductor electrically connected to the first contact surface of the pin, and a second electrical conductor electrically connected to the second contact surface of the socket.

One idea of the disclosure herein is to provide a pin and socket connector with a securing part made of a shape memory alloy so that, when the temperature of the connector increases, e.g. due to increased electrical current through the contact surfaces of the pin and the socket, the securing part deforms and, thereby, urges the contact surfaces of the pin and the socket tighter against each other. That is, the securing part is configured to deform, depending on the temperature, between a first pre-set shape and a second pre-set shape. The first pre-set shape is present at a first temperature below a first temperature threshold. In this state, the metal alloy of which the securing part is made exists in a martensite phase. The second pre-set shape is present at a second temperature above a second temperature threshold higher than the first temperature threshold. In this state, the metal alloy of which the securing part is made exists in an austenite phase and, therefore, assumes a different shape, namely the second pre-set shape, than at the first temperature. The securing part is designed and positioned relative to the pin and the socket such that, in the second pre-set shape, a contact force between the contact surfaces of pin and socket is increased compared to the first pre-set shape.

Hence, by providing the securing part made from a shape memory alloy, the contact force between the contact surfaces of the pin and the socket can be increased with increasing temperatures, i.e. with increasing current flow. This, on the one hand, ensures a strong and reliable electrical contact between pin and socket during phases of high current flow, whereby susceptibility to fretting, e.g. due to vibration, is reduced. On the other hand, pin and socket can be dimensioned such that plugging-in of the pin into the socket still is easily possible, i.e. without applying excessive force or using special tools.

According to some embodiments, the first temperature threshold corresponds to a martensite start temperature of the shape memory alloy and the second temperature threshold corresponds to an austenite finish temperature of the shape memory alloy.

According to some embodiments, the first temperature threshold lies within a range between 50° C. to 80° C., and wherein the second temperature range lies within a range between 95° C. to 120° C.

According to some embodiments, the shape memory alloy is a NiTi alloy, in particular, a NiTiCu, a NiTiHf, or similar alloy.

According to some embodiments, the socket includes a tube shaped part having an inner circumferential surface that at least partially forms the second contact surface, and at least one cut out extending along a central axis and connecting the inner circumferential surface and an opposite outer circumferential surface of the tube shaped part, wherein the securing part is positioned on the outer circumferential surface of the tube shaped part and partially or completely surrounds the tube shaped part, or the securing part is positioned on an outer circumference of the pin, and wherein the securing part, at least when assuming its second pre-set shape, is in contact with the outer circumferential surface. That is, the securing part may act on the socket to generate a force that presses the second contact surface of the socket inwardly against the first contact surface of the pin. In these embodiments, the socket may include a tube shaped part, e.g. in the form of a sleeve, which inner circumferential surface forms the contact surface of the socket and defines a recess for receiving the pin. The tube shaped part may include one or more slits or cut outs so that at least sections of the tube shaped part are elastically deformable in a radial direction that extends perpendicular to the central axis defined by the inner circumferential surface. One advantage of providing the securing part on the outer circumferential surface tube shaped part of the socket is that it is easy to assembly. Another advantage lies in that the pin may be dimensioned relatively thin.

According to some embodiments, the securing part is configured to deform in a radial direction perpendicular to the central axis so that the securing part, in the second pre-set shape, has an expansion in the radial direction smaller than in the first pre-set shape to press the tube shaped part inwards in the radial direction to increase the contact force. For example, the securing part may be realized by an open ring or an open or closed sleeve that partially surrounds the tube shaped part, wherein a diameter of the open ring or the open or closed sleeve, in the second pre-set shape, is smaller compared to the first pre-set shape to increase the clamping force. Alternatively, it would also be possible that the securing part is realized as a sleeve including a sleeve body that surrounds the tube shaped part and has multiple fingers extending from an axial end of the sleeve body, wherein the fingers contact the outer circumferential surface of the tube shaped part, and wherein the fingers, in the second pre-set shape, are positioned closer to the central axis of the tube shaped part than in the first pre-set shape to increase the clamping force. Further optionally, the securing part can be realized by a coil spring that surrounds the tube shaped part, wherein the coil spring defines in inner diameter that is smaller in the second pre-set shape than in the first pre-set shape to increase the clamping force. One advantage of providing the securing part in a shape that is configured to deform in the radial direction is that a clamping force can directly be applied in the radial direction to further increase the contact force between the contact surfaces at elevated temperatures.

According to further embodiments, the tube shaped part includes multiple cut outs distanced to each other in a circumferential direction by webs, the webs forming first surface sections in which the outer circumferential surface of the tube shaped part extends inclined relative to the central axis, and the securing part is configured to deform parallel to the central axis so that the securing part, in the second pre-set shape, has a greater axial length and a greater overlap with the first surface sections than in the first pre-set shape to urge the webs inwards in the radial direction to increase the clamping force. The multiple cut outs are distanced to each other in the circumferential direction and extend along or parallel to the central axis. The webs are formed by the sections of the tube shaped part left between the cut outs and their outer circumferential surface extends inclined or non-parallel to the central axis. The securing part, for example, may be realized by a coil spring or a ring having a plurality of curved slits, wherein the ring or the coil spring, respectively, in the second pre-set shape, has a greater axial length than in the first pre-set shape. Thus, in the second pre-set shape, the securing part has a greater overlap with the inclined, first surface sections of the webs than in the first pre-set shape. Thereby, the securing part travels upwards on the slope formed by the first surface sections of the webs and, consequently, urges the webs closer to the central axis of the tube shaped part, i.e. radially inwards, to increase the clamping force. By varying the overlap of the securing part with an inclined surface of the webs, a clamping force in the radial direction is applied by the webs onto the outer circumferential surface of the tube shaped part as a result of a force applied by the securing part in the axial direction. Therefore, the axial force applied by the securing part can easily be increased by a ratio depending on the slope of the first surface section according to the concept of a wedge gear.

According to some embodiments, the pin includes a tube shaped part having an inner circumferential surface, an outer circumferential surface oriented opposite to the inner circumferential surface and forming, at least partially, the first contact surface, and at least one cut out extending along a central axis of the tube shaped part and connecting the inner circumferential surface and the outer circumferential surface of the tube shaped part, wherein the securing part is positioned within an inner space defined by the inner circumferential surface and at least when assuming the second pre-set shape, is in contact with the inner circumferential surface. That is, the securing part may also be positioned within an inner space or void of the pin and be configured to expand so that the first contact surface of the pin is urged outwardly to increase the contact force between the pin and the socket. To this end, the pin may have a tubular part or sleeve configured to be introduced into a recess of the socket, wherein the tubular part has at least one axial slit or cut out so that the tubular part can be elastically deformed in the radial direction. One advantage of providing the securing part within the interior of the pin is that the securing part is to be realized with a smaller radial expanse. That is, the securing part, generally, has a smaller thermal mass and, consequently, the temperature of the securing part changes quicker which means that the contact force can be varied quicker, too.

According to some embodiments, the securing part is configured to deform in a radial direction perpendicular to the central axis so that the securing part, in the second pre-set shape, has an expansion in the radial direction greater than in the first pre-set shape to increase the contact force. For example, the securing part may be realized by an open ring or an open or closed sleeve arranged on the inner circumferential surface of the tube shaped part, wherein a diameter of the open ring or the open or closed sleeve, in the second pre-set shape, is greater compared to the first pre-set shape to increase the clamping force. Alternatively, the securing part may also be realized as a sleeve including a sleeve body positioned within the inner void defined by the inner circumferential surface of the tube shaped part, wherein the sleeve has multiple fingers extending from an axial end of the sleeve body, wherein the fingers contact the inner circumferential surface of the tube shaped part, and wherein the fingers, in the second pre-set shape, are positioned further away from the central axis in the radial direction than in the first pre-set shape to increase the clamping force. Further optional, the securing part may be realized by a coil spring positioned within the inner void defined by the inner circumferential surface of the tube shaped part, wherein the coil spring defines an outer diameter that is greater in the second pre-set shape than in the first pre-set shape to increase the clamping force.

According to further embodiments, the tube shaped part may include multiple cut outs distanced to each other in a circumferential direction by webs, the webs forming first surface sections in which the inner circumferential surface of the tube shaped part extends inclined relative to the central axis, and the securing part is configured to deform parallel to the central axis so that the securing part, in the second pre-set shape, has a greater axial length and a greater overlap with the first surface sections than in the first pre-set shape to urge the webs outwards in the radial direction to increase the clamping force. Similar as explained above with regard to the embodiments where the securing part is arranged on the outer circumferential surface of the tubular part of the socket, also in the embodiments where the securing part is arranged within the inner void defined by the inner circumferential surface of the tube shaped part, an axial deformation of the securing part may advantageously be transformed in a radial force urging the sections or webs of the pin outwardly against the second contact surface of the socket. For example, the securing part may be realized by a coil spring or a ring having plurality of curved slits, wherein the coil spring or the ring, respectively, in the second pre-set shape, has a greater axial length and a greater overlap with the first surface sections than in the first pre-set shape to urge the webs radially away from the central axis to increase the clamping force.

Hence, generally, there are provided embodiments, in which the securing part is configured to deform in the radial direction and is realized by an open ring or an open or closed sleeve having a different diameter in the first and in the second pre-set shape, or a sleeve including a sleeve body and multiple fingers that extend from an axial end of the sleeve body and assume different radial positions in the first and the second pre-set shape, or a coil spring that has a different diameter in the first and second pre-set shape. Alternatively, there may be embodiments in which the securing part is configured to deform parallel to the central axis and is realizes by a coil spring that, in the second pre-set shape, has a greater axial length than in the first pre-set shape, or a ring having a plurality of curved slits, the ring, in the second pre-set shape, having a greater axial length than in the first pre-set shape.

According to some embodiments, the first contact surface of the pin defines a double cone, and the second contact surface of the cylinder part has a complementary shape. Thereby, an even more reliable interlock between the pin and the socket can be achieved when the pin is introduced into the socket.

According to some embodiments, the pin includes a guide part and a contact part that has the first contact surface and that is coupled to the guide part so as to be movable relative to the guide part along a central axis of the pin, wherein the contact surface of the pin or the socket includes an inner surface section, and the contact surface of the other one of the pin and the socket includes an outer surface section. The inner surface section may extend tapered and forms a recess arranged coaxially to the central axis of the pin when the pin is received in the socket, and the outer surface section is formed complementary to the inner surface section so that the recess is configured to receive the outer surface section. For example, the inner surface section may define a cone or dome shaped recess, and the outer surface section may define a cone or dome. The securing part may be positioned between the guide part and the contact part of the pin and is configured to deform parallel to the central axis so that the securing part, in the second pre-set shape, has a greater axial length than in the first pre-set shape to urge inner and outer surface sections against each other to increase the clamping force. Hence, the securing part not only may help to increase a clamping or contact force but also can increase a contact force in an axial direction. The securing part, according to these embodiments, for example, may be a coil spring or a ring having a plurality of curved slits, as already mentioned above.

According to some embodiments, the securing part at least partially forms the first or the second contact surface. That is, a part of the socket or the pin may be formed by the securing part made of the shape memory alloy. Thereby, the number of parts of the connector is advantageously reduced.

According to some embodiments, the socket includes a sleeve for receiving the pin therein formed by the securing part, wherein an inner diameter of the sleeve, in the second pre-set shape, is smaller than in the first pre-set shape to increase the clamping force. Optionally, the securing part may include a plurality of spaced wires that commonly form the sleeve, wherein the wires preferably define a hyperboloid or similar shape. Generally, in the second pre-set shape, a minimum inner diameter of the sleeve may be smaller than in the first pre-set shape to increase the contact force.

According to some embodiments, the pin includes a shaft and a head having a greater outer diameter than the shaft, wherein the socket includes an inner space having an opening to receive the head, and wherein the securing part is realized by a cantered coil spring which, when the pin is received within the opening, surrounds the shaft of the pin, and which, in the second pre-set shape, defines a smaller inner diameter than in the first pre-set shape. Thereby, the pin, on the one hand, can easily be secured within the opening by the elasticity of the cantered coil spring. On the other hand, the contact force between the cantered coil spring, which may form at least partially the second contact surface, and the pin can advantageously be increased at elevated temperatures.

The features and advantages disclosed herein in connection with one aspect of the disclosure herein are also disclosed for the other aspect and vice versa. Further, the embodiments can be combined with each other.

BRIEF DESCRIPTION OF THE DRAWINGS

The disclosure herein will be explained in greater detail with reference to example embodiments depicted in the drawings as appended.

The accompanying drawings are included to provide a further understanding of the disclosure herein and are incorporated in and constitute a part of this specification. The drawings illustrate the embodiments of the disclosure herein and together with the description serve to explain the principles of the disclosure herein. Other embodiments of the disclosure herein and many of the intended advantages of the disclosure herein will be readily appreciated as they become better understood by reference to the following detailed description. The elements of the drawings are not necessarily to scale relative to each other. Like reference numerals designate corresponding similar parts.

Figure 1:
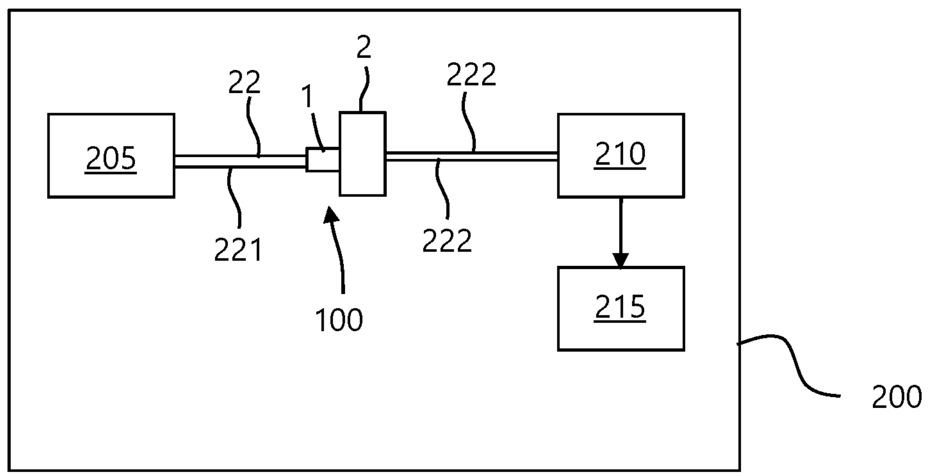
FIG. 1 schematically illustrates a block diagram of an aircraft according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the disclosure herein. Generally, this application is intended to cover any adaptations or variations of the specific embodiments discussed herein.

FIG. 1 schematically illustrates a block diagram of an aircraft 200, e.g. a passenger aircraft or a freighter. As schematically shown, the aircraft 200 includes an electrical voltage source 205, e.g. a generator, a battery, a fuel cell or similar, and an electric consumer 210, for example, an electric motor that drives a fan or a propeller to generate thrust. As shown in FIG. 1, the voltage source 205 and the electric consumer 210 are electrically connected to each other via cables including electrical conductors 221, 222. As is schematically shown in FIG. 1, the electrical conductors 221, 222, e.g. conductor wires, of two cable sections can be electrically connected to each by an electrical connector 100 that includes a pin 1, a socket 2, and a securing part 3 (not shown in FIG. 1). The conductors 221, 222 and the connector 100 may be transfer a considerable amount of electrical energy. For example, due to an increasing number and increasing power of electric consumers 210 in the aircraft 200, electrical currents up to 500 Ampere may be conducted through the connector. The aircraft 200 provides an environment in which the connector 100 may be exposed to high vibrational loads, e.g. during take-off and landing. The disclosure herein provides the connector 100 with a securing part 3 that is configured to ensure tight and reliable electric contact in the connector especially during phases of high current flowing through the connector to prevent damage to the electrically conducting parts of the connector 100 caused by vibrational loads during phases of high current flow.

Figure 2:
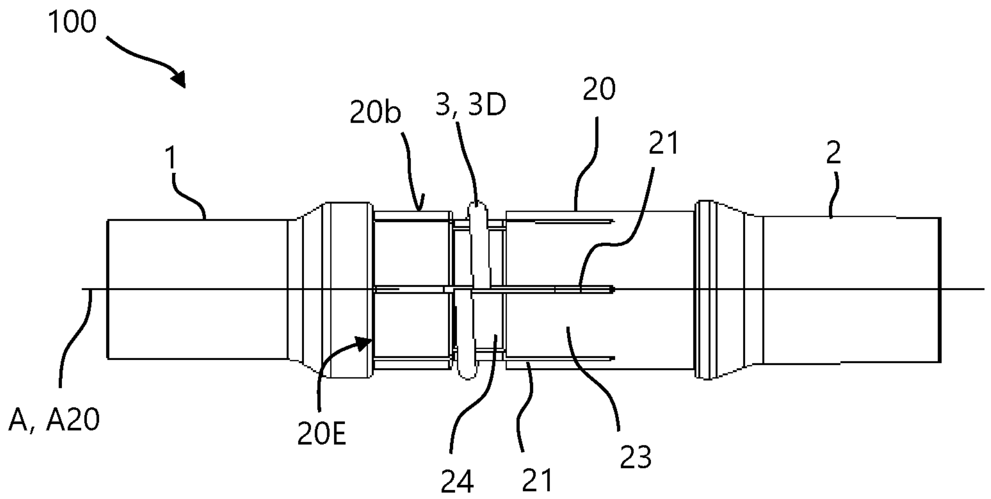
FIG. 2 schematically illustrates an electrical connector according to an embodiment of the disclosure herein.
Figure 3:
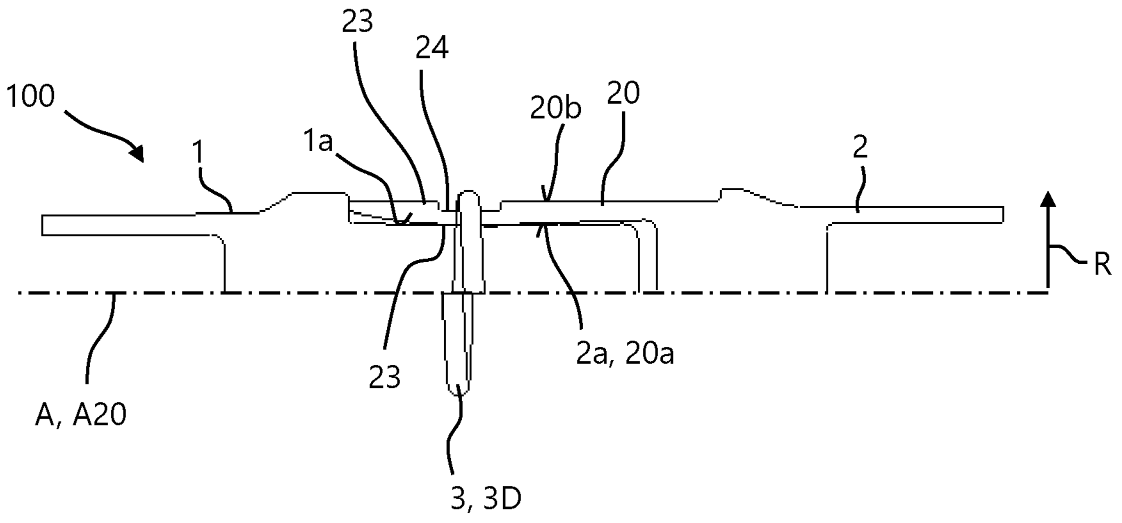
FIG. 3 schematically illustrates a cross-sectional view of the connector shown in FIG. 2.

FIG. 2 exemplarily shows an electrical connector 100 that may be used in an aircraft 200 as discussed above. FIG. 3 shows a sectional view of the connector 100 shown in FIG. 2. As shown in FIG. 2, the connector 100 includes a pin 1, a socket 2, and a securing part 3.

The pin 1, generally, may be realized as a longitudinal part and includes a first contact surface 1*a*. As exemplarily shown in FIG. 3, the first contact surface 1*a* may, for example, by a cylindrical or substantially cylindrical surface. Alternatively, the contact surface 1*a* may also define another circumference, e.g. a polygonal circumference such as triangular, rectangular, star shaped or similar. Optionally, first contact surface 1*a* of the pin 1 may define a double cone shape. At least the contact surface 1*a* of the pin 1 is formed of an electrically conductive material, e.g. aluminium alloy, copper alloy, or another conductive metal. When used in an aircraft 200 as shown in FIG. 1, a first electrical conductor 221 is electrically connected to the first contact surface 1*a* of the pin 1.

The socket 2 is configured to receive the pin 1, as exemplarily shown in FIGS. 2 and 3 which show the connector 100 in a plugged-in state in which the pin 1 is received in the socket 2. As visible in FIGS. 2 and 3, the socket 2, generally, may be realized as longitudinal part defining a recess or opening for receiving the pin 1. Generally, the socket 2 includes a second contact surface 2*a* that is in contact with first contact surface 1*a* of the pin 1 when the pin 1 is received in the socket 2. As shown by way of example only in FIG. 3, the second contact surface 2*a* may be formed generally cylindrical. Generally, the second contact surface 2*a* may be formed complementary to the first contact surface 1*a*. At least the contact surface 2*a* of the socket 2 is formed of an electrically conductive material, e.g. aluminium alloy, copper alloy, or another conductive metal.

When used in an aircraft 200, for example, as discussed above and shown in FIG. 1, a second electrical conductor 222 is electrically connected to the second contact surface 2*a* of the socket 2.

In the plugged-in state as shown in FIGS. 1 and 2, the first and second contact surfaces 1*a*, 2*a*, preferably, surround a common central axis A that forms a central axis of the connector 100. It should be noted, that the connector 100, generally, may include a first connector half and a second connector half. Each connector half may include a shell (not shown) that surrounds an electrically insulating insert (not shown). The insert of the first connector half may carry at least one pin 1 as an electrical contact, and the insert of the second half may carry a corresponding number of sockets 2 as an electrical contact. The first and second half may be plugged together so that the pins 1 and sockets 2 can be brought into the plugged-in state.

As shown in FIGS. 2 and 3, the socket 2 may include a tube shaped part 20. The tube shaped part 20, as shown in FIG. 3, includes an inner circumferential surface 20*a* that forms the second contact surface 2*a* and that, optionally, may be cylindrical. Generally, the inner circumferential surface 20*a* defines a socket central axis A20. Further, the inner circumferential surface 20*a*, at least partially, forms the second contact surface 2*a* of the socket 2. The tube shaped part 20 further includes an outer circumferential surface 20*b* oriented opposite to the inner circumferential surface 20*a* with respect to a radial direction R that extends perpendicular to the socket central axis A20. The socket central axis A20 and the connector central axis A are coaxial to each other.

As further shown in FIG. 2, the tube shaped part 20 of the socket 2 may include at least one cut out 21 extending along a central axis A20 and forming a passage connecting the inner circumferential surface 20*a* and the outer circumferential surface 20*b*. As shown in FIG. 2, the at least one cut out 21 may extend from a free axial end 20E of the tube shaped part 2 that, in the plugged-in state, faces the pin 1. Further optional, there may be provided multiple cut outs 21 that are spaced to each other along the circumference or in the circumferential direction. Between adjacent cut outs 21, the tube shaped part 20 forms webs 23. The at least one cut out 21 eases elastic deformation of the tube shaped part 20 in the radial direction.

As shown in FIG. 2, in the plugged-in state, the pin 1 is received in the tube shaped part 20 of the socket 2 so that the outer circumferential surface of the pin 1 that forms the first contact surface 1*a* is in contact with the inner circumferential surface 20*a* of the tube shaped part 20 that forms the second contact surface 2*a*. The pin 1 and the socket 2, in this case the tube shaped part 20, are dimensioned such that first contact surface 1*a* and the second contact surface 2*a* are pressed against each other with a predefined clamping or contact force. In the example of FIGS. 2 and 3, the clamping force acts in the radial direction R and results from the elastic deformation of the tube shaped part 20 in response to the pin 1 being introduced into the tube shaped part 20.

The securing part 3 serves to increase the clamping force that presses together the first and the second contact surfaces 1*a*, 2*a* in the plugged-in state of the connector 100 in situations where high electrical currents are conducted through the contact surfaces 1*a*, 2*a*. The securing part 3 is made of a shape memory alloy configured to exist in a martensite phase and an austenite phase depending on a temperature of the securing part 3. For example, the securing part 3 may be made of a NiTi alloy, in particular, a NiTiCu, a NiTiHf, or similar alloy. It is known that this group of materials may be trained, by applying stress and deforming the material, to assume different shapes at different temperatures. Therefore, specifically, the securing part 3 made of shape memory alloy is configured to assume a first pre-set shape when the temperature of the securing part 3 is below a first temperature threshold, and a second pre-set shape when the temperature of the securing part 3 is above a second temperature threshold higher than the first temperature threshold. The first temperature threshold corresponds to a martensite start temperature of the used shape memory alloy, and the second temperature threshold corresponds to an austenite finish temperature of the used shape memory alloy. The shape memory alloy is not limited to NiTi-alloys but, generally, any alloys may be used having a martensite start temperature within a range between 50° C. to 80° C., and an austenite finish temperature within a range between 95° C. to 120° C., for example. For manufacturing the securing part 3 from shape memory alloy, various processes can be used such as forming, rolling, additive manufacturing, milling, or similar.

FIGS. 2 and 3, by way of example only, show that the securing part 3 may be realized by a coil spring 3D which, in the example of FIGS. 2 and 3, only has one winding. The coil spring 3D may be positioned on the outer circumferential surface 20*b* of the tube shaped part 20, for example, in an optional holding channel 24 extending circumferentially around the tube shaped part 20. The shape memory alloy of the coil spring 3D may be trained such that the coil spring 3D, in the first pre-set shape, defines a first inner diameter and, in the second pre-set shape defines a second inner diameter smaller than the first diameter. That is, when the temperature of the coil spring 3D increases in response to electrical current flowing through the pin 1 and the socket 2, the coil spring 3D deforms from its first to its second pre-set shape and, as a result, applies an increased radial clamping force to the tube shaped part 20 and the pin 1. Hence, in situations of high current flow that leads to increased temperature of the securing part 3, the clamping force that presses together the contact surfaces 1*a*, 2*a* can be increased. Although it is advantageous that the securing part 3 applies a clamping force that presses the first and the second contact surfaces 1*a*, 2*a* together also when assuming the first pre-set shape, it may also be provided that the clamping force applied by the securing part 3 assuming its first pre-set shape is zero. Generally, the contact or clamping force applied by the securing part 3 in the second pre-set shape is greater than in the first pre-set shape.

Figure 4:
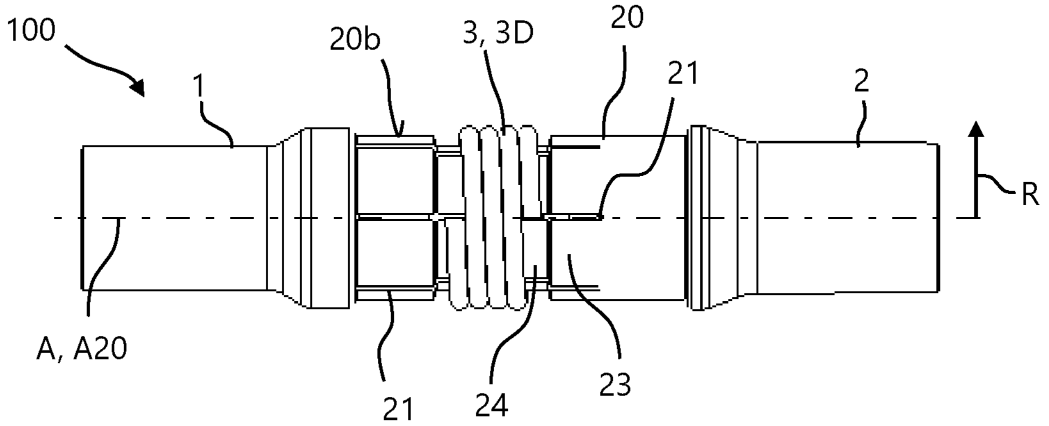
FIG. 4 schematically illustrates an electrical connector according to a further embodiment of the disclosure herein.
Figure 5:
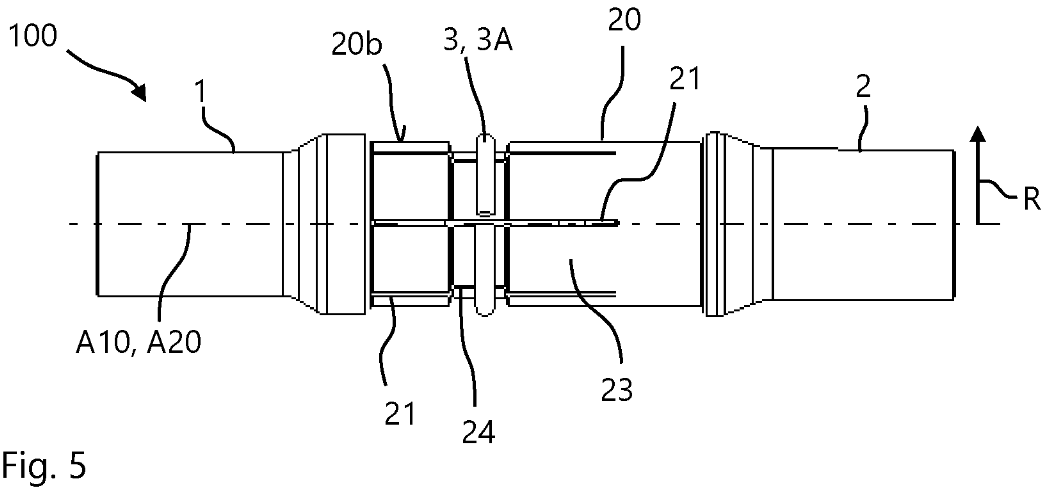
FIG. 5 schematically illustrates an electrical connector according to a further embodiment of the disclosure herein.
Figure 6:
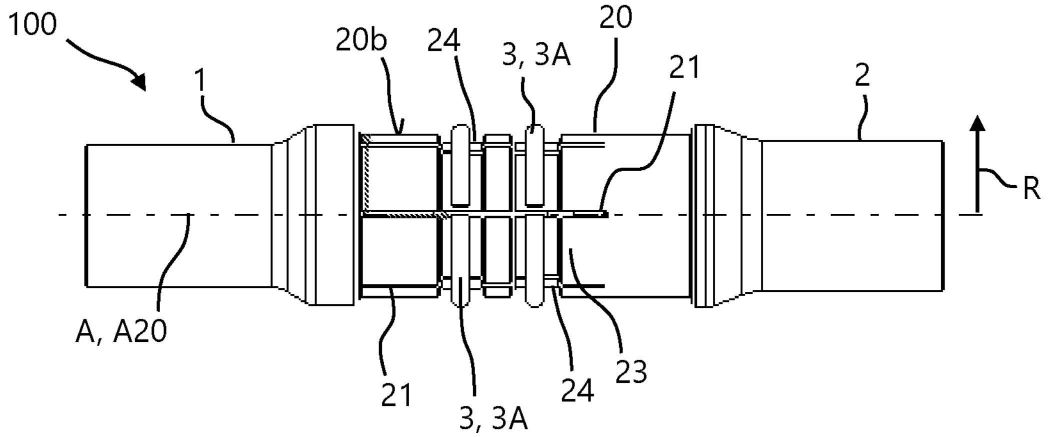
FIG. 6 schematically illustrates an electrical connector according to a further embodiment of the disclosure herein.

It should be noted that the securing part 3 is not limited to a coils spring 3D having one winding as shown in FIGS. 2 and 3. For example, FIG. 4 shows a connector 100 that differs from the connector of FIGS. 2 and 3 only in that it has a securing part 3 formed by a coil spring 3D having multiple windings. FIG. 5 shows a connector 100 in which the securing part 3, instead of a coil spring 3D, is realized by an open ring 3A that partially surrounds the outer circumferential surface 20*b* of the tube shaped part 20. Furthermore, it should be noted that also multiple securing parts 3 can be used. For example, FIG. 6 shows a connector 100 in which two securing parts 3 in the form of open rings 3A are provided on the outer circumferential surface 20*b* of the tube shaped part 20 and positioned spaced to each other along the socket central axis A20, for example, in corresponding holding channels 24. Thus, generally, the securing part 3 may be positioned so as to partially or completely surround the outer circumferential surface 20*b* of the tube shaped part 20. Further, the securing part 3 may be configured to deform in the radial direction R so that the securing part 3, in the second pre-set shape, has an expansion in the radial direction R smaller than in the first pre-set shape to press the tube shaped part 20 inwards in the radial direction R to increase the contact force.

Figure 7:
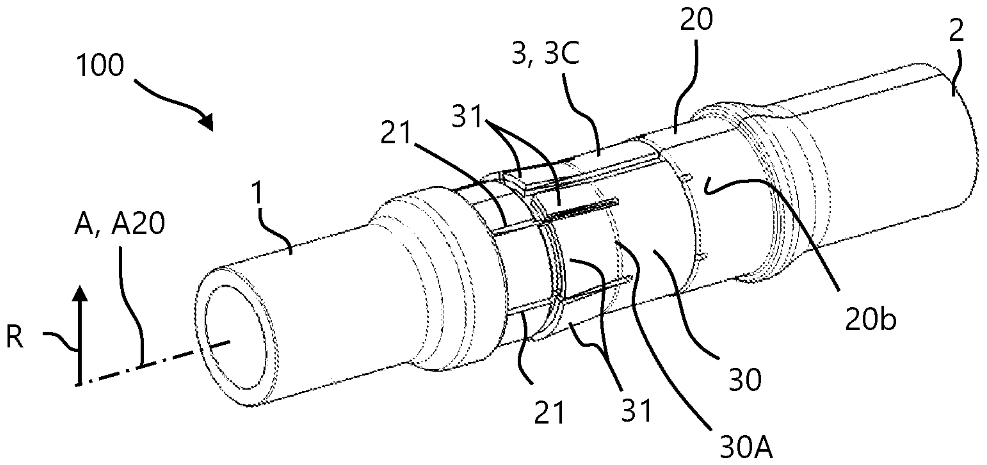
FIG. 7 schematically illustrates an electrical connector according to a further embodiment of the disclosure herein, wherein a securing part is shown to assume a first pre-set shape.
Figure 8:
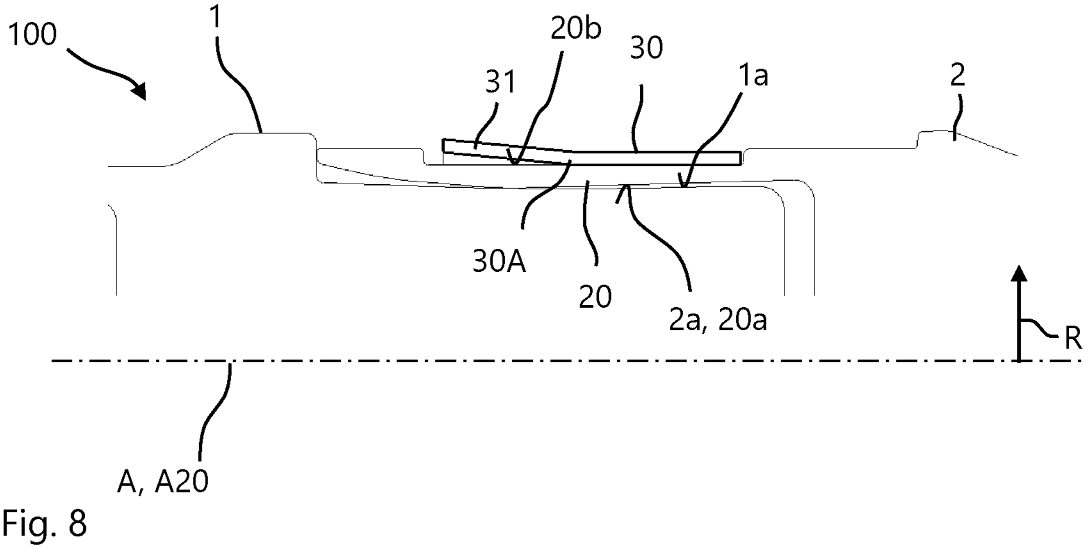
FIG. 8 schematically illustrates a cross-sectional view of the connector shown in FIG. 7.
Figure 9:
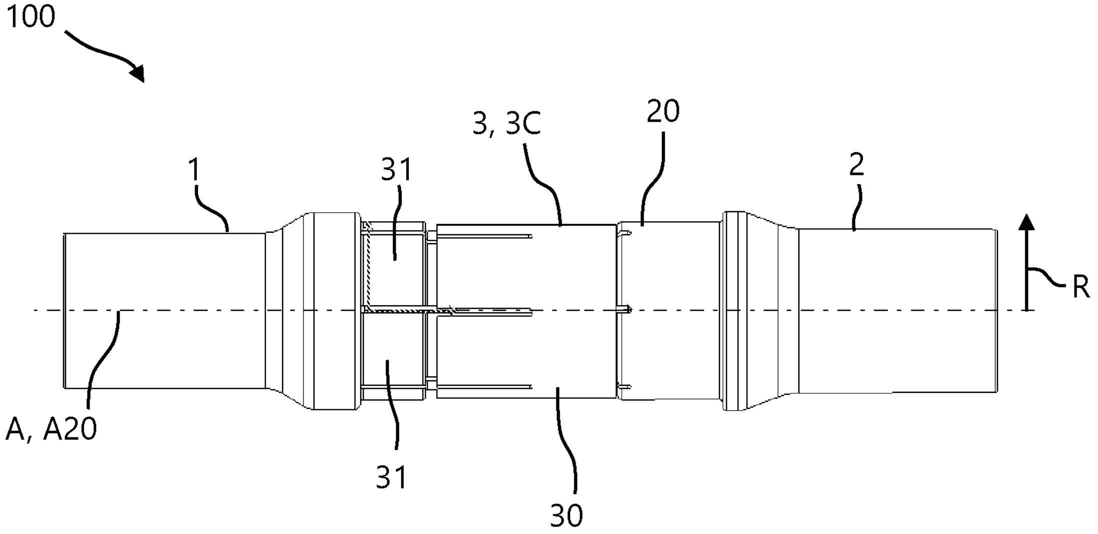
FIG. 9 schematically illustrates the connector shown in FIG. 7, wherein the securing part is shown to assume a second pre-set shape.

FIGS. 7 to 9 exemplarily show a further connector 100 having a securing part 3 that is positioned on the outer circumferential surface 20*b* of the tube shaped part 20 and that is configure to deform in the radial direction R1 so that the securing part 3, in the second pre-set shape, has an expansion in the radial direction R smaller than in the first pre-set shape to press the tube shaped part 20 inwards in the radial direction R to increase the contact force. FIGS. 7 to 9, the securing part 3 is realized as a sleeve 3C. The sleeve 3C, as shown, may include a sleeve body 30 that surrounds the tube shaped part 20. Multiple fingers 31 extend from an axial end 30A of the sleeve body 30. The shape memory alloy of the securing part 3 may be trained such that, in the first pre-set shape, the fingers 31 extend inclined outwards with respect to the radial direction R, as shown in FIGS. 7 and 8, and, in the second pre-set shape, are bent inwards in the radial direction R, as shown in FIG. 9. Thus, the fingers 31, in the second pre-set shape, are positioned closer to the central axis of the tube shaped part 20 than in the first pre-set shape and, as a result, increase the clamping force when the temperature is above the second temperature threshold.

Figure 10:
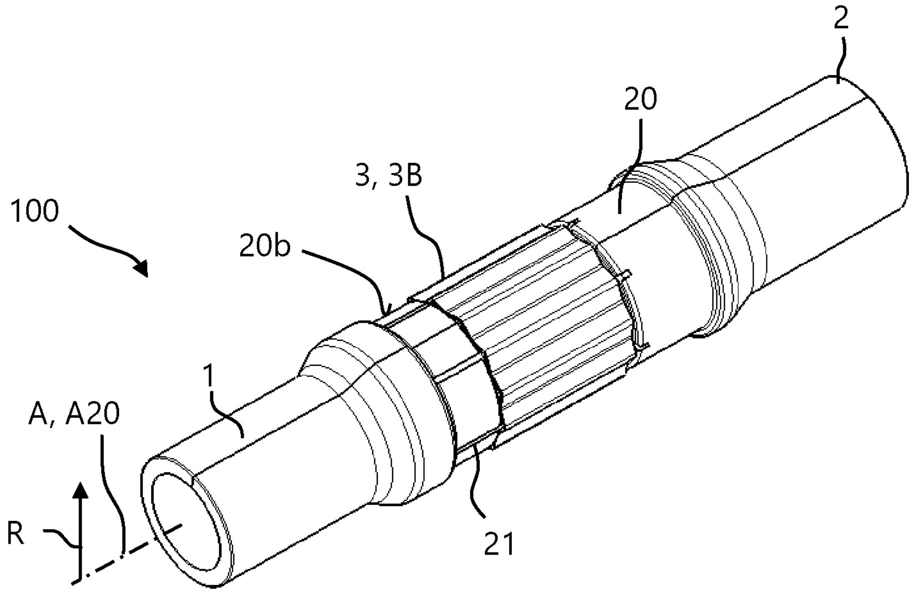
FIG. 10 schematically illustrates an electrical connector according to a further embodiment of the disclosure herein.
Figure 19:
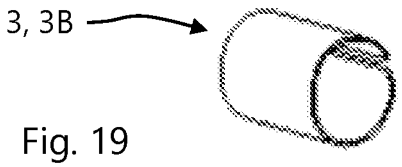
FIG. 19 schematically illustrates a securing part formed as an open sleeve.

FIG. 10 shows a further connector 100 that differs from the connector 100 of FIGS. 7 to 9 in that the securing part 3 is formed by a sleeve 3B that has an undulated circumference. The sleeve 3B defines an inner circumference that, in the second pre-shaped state, is smaller than in the first pre-set shape. It should be noted that instead of a closed sleeve 3B also an open sleeve 3B can be used that only partially surrounds the outer circumferential surface 20*b* of the tube shaped part 20 of the socket 2. An open sleeve 3B is exemplarily shown in FIG. 19.

Hence, generally, the securing part 3 can be positioned on the outer circumferential surface 20*b* of the tube shaped part 20 so that it partially or completely surrounds the tube shaped part 20, and is in contact with the outer circumferential surface 20*b*. Further, the securing part 3 can be configured to deform in the radial direction R so that so that the securing part 3, in the second pre-set shape, has an expansion in the radial direction R smaller than in the first pre-set shape to press the tube shaped part 20 inwards in the radial direction R to increase the contact or clamping force.

Figure 11:
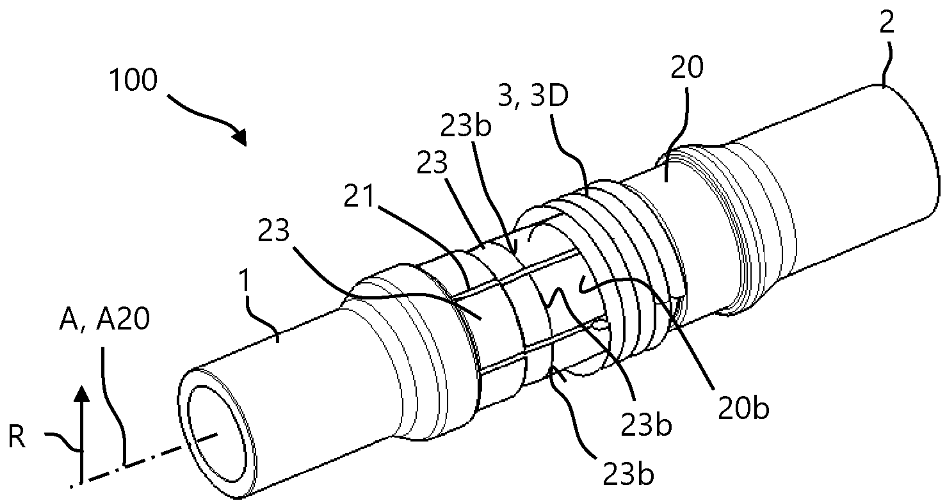
FIG. 11 schematically illustrates an electrical connector according to a further embodiment of the disclosure herein, wherein a securing part is shown to assume a first pre-set shape.
Figure 12:
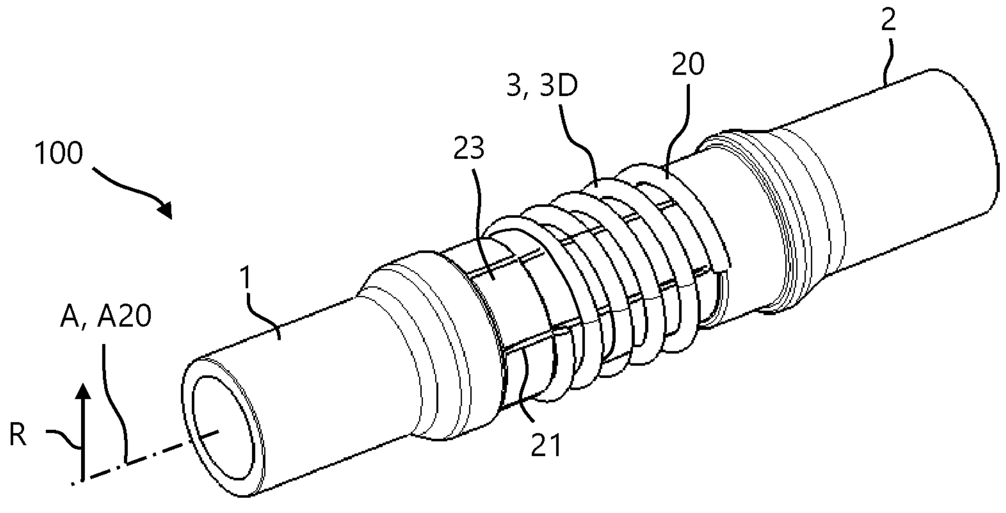
FIG. 12 schematically illustrates the electrical connector according of FIG. 11, wherein the securing part is shown to assume a second pre-set shape.
Figure 13:
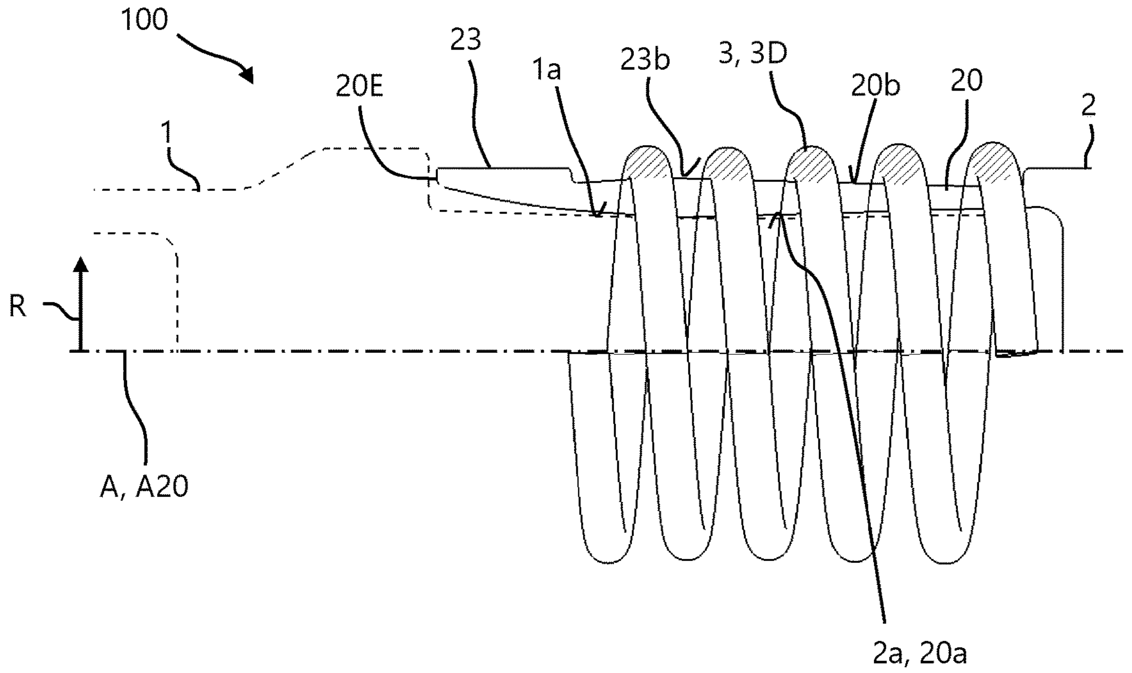
FIG. 13 schematically illustrates a cross-sectional view of the connector shown in FIGS. 11 and 12, wherein the securing part is shown to assume the second pre-set shape.

Alternatively to being deformable in the radial direction R, the securing part 3 can also be configured to be deformable in the axial direction, that is, in a direction parallel to the central axis A, i.e. the socket central axis A20. For example, FIGS. 11 and 12 show a connector 100 that has the same configuration as the connector of FIG. 4 except for the outer circumferential surface 20*b* of the tube shaped part 20 and the deformation capabilities of the coil spring 3D when deforming from the first to the second pre-set shape and vice versa. FIG. 13 is a cross-sectional view of the connector shown in FIGS. 11 and 12.

As shown in FIGS. 11 and 12, the tube shaped part 20 of the socket includes a plurality of cut outs 21 spaced in the circumferential direction by webs 23 as explained above. The webs 23 form first surface sections 23*b* that are part of the outer circumferential surface 20*b* of the tube shaped part 20. As visible best in FIG. 13, the first surface sections 23*b* extend inclined relative to the socket central axis A20. For example, the webs 23 may have a substantially wedge shaped cross-section as shown in FIG. 13. The shape memory alloy of the coil spring 3D, or generally the securing part 3, may be trained so that the coil spring 3D, in the second pre-set shape, has a greater axial length than in the first pre-set shape. FIG. 11 shows the coil spring 3D in its first pre-set shape. FIGS. 12 and 13 show the coil spring 3D in its second pre-set position. As visible best from FIG. 12, when the temperature of the coil spring 3D is increased above the second threshold temperature, the coil spring 3D is deformed to its second pre-set position in which it has a greater overlap with the first surface sections 23*a* of the webs 23 than in the first pre-set shape. Due to the inclined course of the first surface sections 23*a*, the coil spring 3D, in the second pre-set shape has travelled against the slope of the first surface sections 23*a* and, thereby, has urged the webs 23 inwards in the radial direction R, whereby the clamping force is increased.

Figure 14:
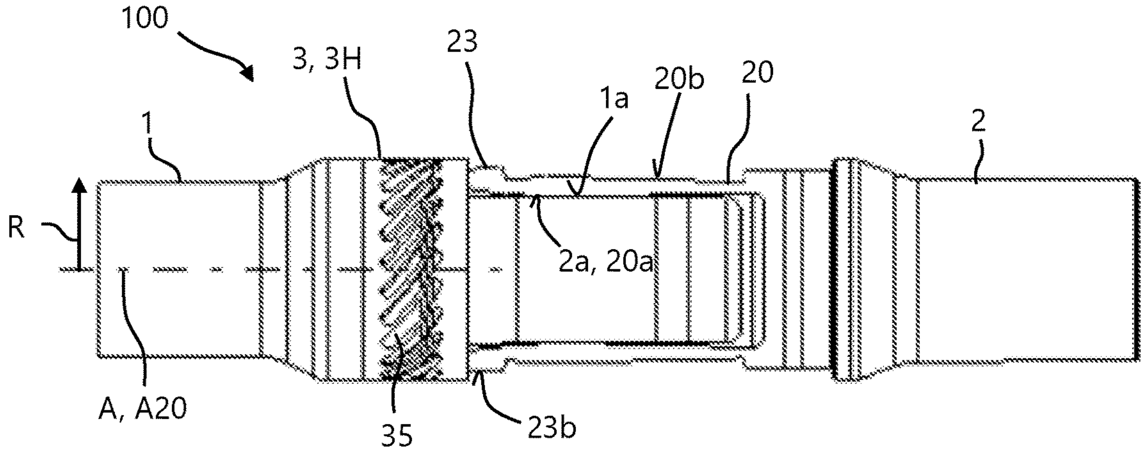
FIG. 14 schematically illustrates an electrical connector according to a further embodiment of the disclosure herein, wherein a securing part is shown to assume a first pre-set shape.
Figure 15:
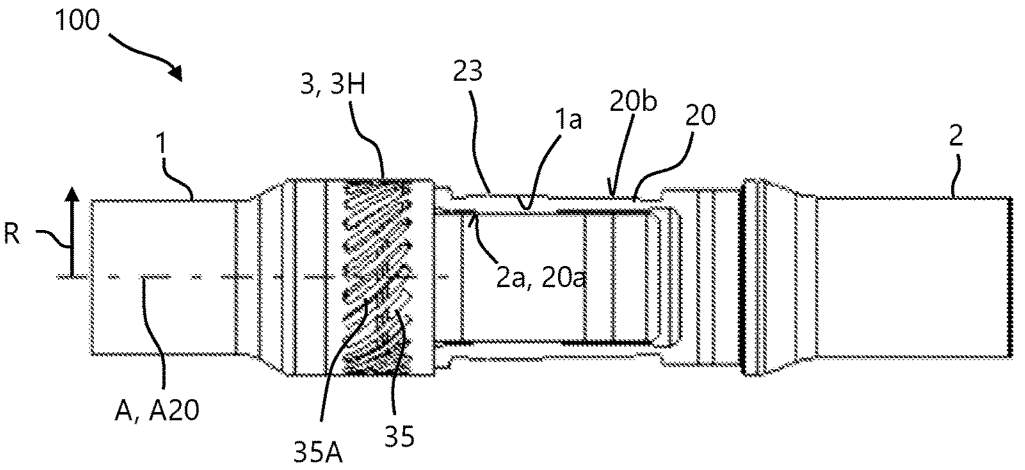
FIG. 15 schematically illustrates the electrical connector according of FIG. 14, wherein the securing part is shown to assume a second pre-set shape.

It should be noted that the securing part 3 configured to be deformable in the axial direction is not limited to a coil spring 3D. For example, the securing part 3 may also be formed by a ring 3H having a plurality of curved slits 35 as exemplarily shown in FIGS. 14 and 15. The slits 35 of the ring 3H, may have a closed circumference and are separated in the circumferential direction by webs 35A. The ring 3H may be arranged at the same axial position as the coil spring in FIGS. 11 to 13. Alternatively, the ring 3H may be positioned at the free end 20E of the tube shaped body 20 as exemplarily shown in FIGS. 14 and 15. As is visible from FIG. 13, the webs 23 of the tube shaped part 20, also at the free end 20E may define inclined first surface sections 23*b* so that an overlap between the first surface sections 23*b* is increased, when the ring 3H deforms from its first pre-set shape as shown in FIG. 14 to its second pre-set shape as shown in FIG. 15. Consequently, because the ring 3H, in the second pre-set shape, has a greater axial length than in the first pre-set shape, the webs 23 of the tube shaped part 20 are urged further inwards in the radial direction R to increase the clamping force.

That is, generally, the securing part 3 is positioned such that it applies a contact or clamping force that presses the first and second contact surfaces 1*a*, 2*a* against each other when the pin 1 is received in the socket 2, wherein the contact or clamping force applied by the securing part 3 in the second pre-set shape is greater than in the first pre-set shape.

Figure 16:
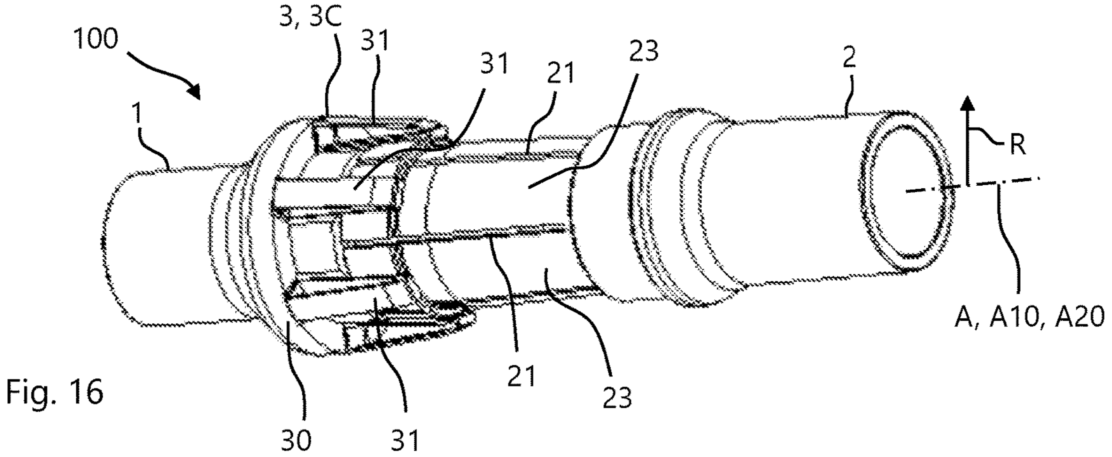
FIG. 16 schematically illustrates an electrical connector according to a further embodiment of the disclosure herein.
Figure 17:
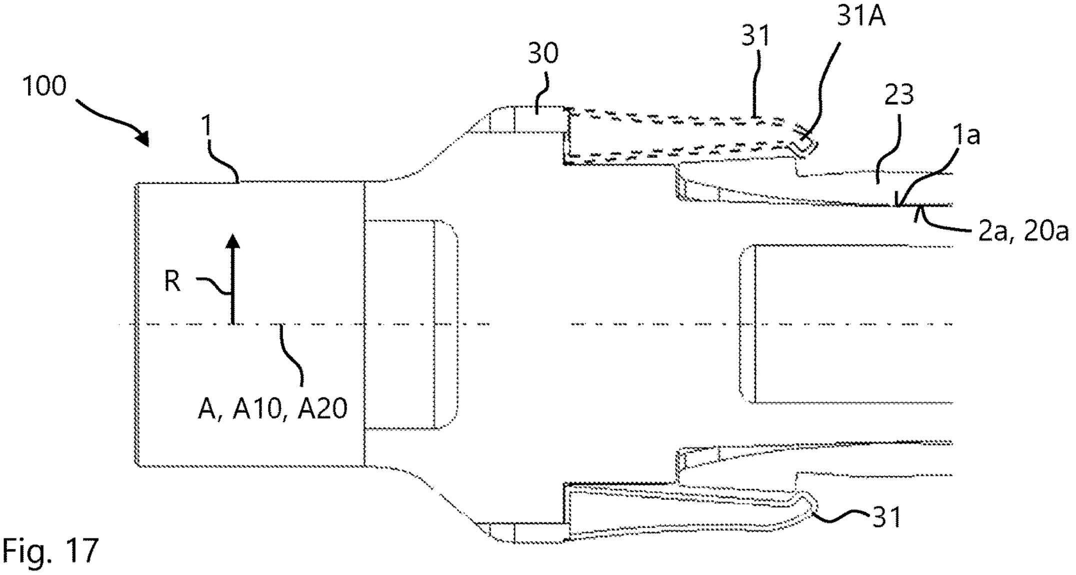
FIG. 17 schematically illustrates a cross-sectional view of the connector shown in FIG. 16.

FIGS. 16 and 17 show a further connector 100 which is similar to the connector 100 shown in FIGS. 7 to 9. Also in the connector 100 shown in FIGS. 16 and 17, the securing part 3 is realized by a sleeve 3 including a sleeve body 30 and a plurality of fingers 31 that extend from an axial end of the sleeve body 30. Compared to the sleeve 3C forming the securing part 3 in FIGS. 7 to 9, the fingers 31 of the sleeve 3C shown in FIGS. 16 and 17 are dimensioned smaller and spaced further in the circumferential direction. Further, a tip end 31A may, optionally, protrude inwardly from the finger 31 with respect to the radial direction R. Moreover, the sleeve body 30 may be coupled to an outer circumference of the pin 1, in particular, so as to be coaxial with a pin central axis A10, as shown in FIG. 17. FIG. 17 schematically shows a cross-sectional view of the connector 100 of FIG. 16, wherein the sleeve 3C is shown to assume its first pre-set shape. The shape memory alloy of the securing part 3 may be trained such that, in the second pre-set shape, the fingers 31 are bent inwards in the radial direction R, so that the fingers 31, in the second pre-set shape, are positioned closer to the central axis of the tube shaped part 20 than in the first pre-set shape and, as a result, urge the webs 23 inwards in the radial direction R to increase the clamping force when the temperature is above the second temperature threshold.

FIGS. 2 to 17 show connectors 100 where the securing part 3 is positioned at the outer circumference of the connector 100, e.g. at the outer circumferential surface 20*b* of the tube shaped part 20 of the socket 2 or at the outer circumference of the pin 1. Further, in FIGS. 2 to 17, the securing part 3, in its second pre-set shape applies a force that is directed inwards with respect to the radial direction R. However, generally, the securing part 3 is positioned such that it applies a contact or clamping force that presses the first and second contact surfaces 1*a*, 2*a* against each other when the pin 1 is received in the socket 2, wherein the contact or clamping force applied by the securing part 3 in the second pre-set shape is greater than in the first pre-set shape. Therefore, it is also possible to provide the securing part 3 within the pin 1 so as to urge the first contact surface 1*a* radially outwards, as is exemplarily shown in FIGS. 18, 20 and 21.

Figure 18:
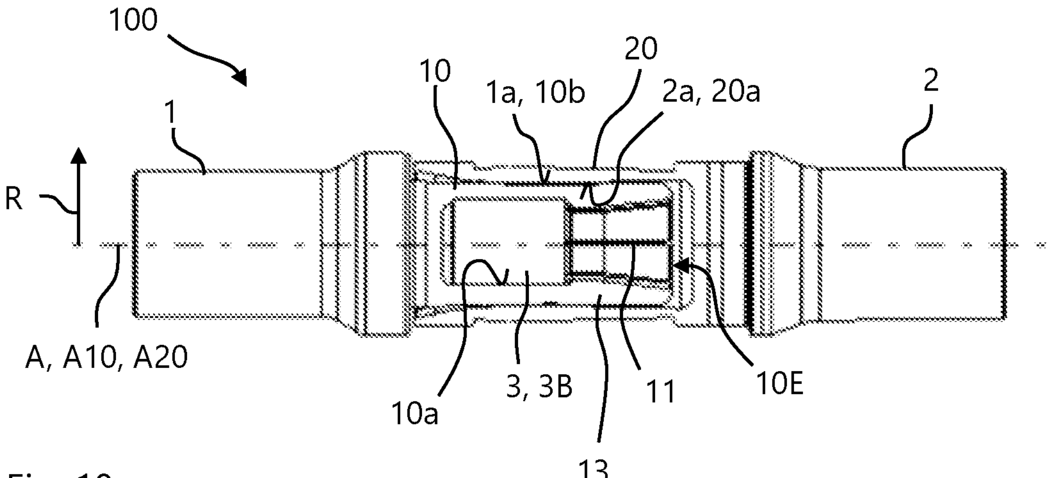
FIG. 18 schematically illustrates a cross-sectional view of an electrical connector according to a further embodiment of the disclosure herein.

FIG. 18 shows a connector 100 in which the socket 2 is formed similar as explained above. In particular, the socket 2 may comprise a tube shaped part 20 comprising an inner circumferential surface 20*a* that at least partially forms the second contact surface 2*a*. It goes without saying that the tube shaped part 20 may also have all optional features described above, e.g. the cut outs 21. As shown in FIG. 18, the pin 1 may include a tube shaped part 10 having an inner circumferential surface 10*a*, an outer circumferential surface 10*b* oriented opposite to the inner circumferential surface 10*a*. The outer circumferential surface 10*b* at least partially forms the first contact surface 1*a* and may, for example, be cylindrical or generally cylindrical. In this regard, "generally cylindrical" also includes a double cone shape. The inner circumferential surface 20*a* of the tube shaped part 20 of the socket 2 may be formed complementary. However, other circumferential shapes such as polygonal are possible. The inner circumferential surface 10*a* defines an inner space or void and surrounds a pin central axis A10. The pin central axis A10 and the socket central axis A20 are coaxial in the plugged-in state of the connector 100 and form a connector central axis A. As visible in FIG. 18, the tube shaped part 10 of the pin 1 may also have at least one cut out 11 that extends along the pin central axis A10 and connects the inner circumferential surface 10*a* and the outer circumferential surface 10*b*. For example, multiple cut outs 11 may be provided that are spaced to each other in the circumferential direction by webs 13, for example. As shown in FIG. 18, the cut outs 11 may extend from a free end 10E of the tube shaped part 10 of the pin 1 that faces the socket 2 in the plugged-in state.

The securing part 3, as exemplarily shown in FIG. 18, may be realized by an open sleeve 3B (FIG. 19) positioned within the inner space defined by the inner circumferential surface 10*a*. The shape memory alloy of the sleeve 3B may be trained such that the sleeve, in the second pre-set shape, has an outer diameter that is greater than its outer diameter in the first and in the second pre-set shape. Therefore, in the second pre-set shape, the sleeve 3B contacts the inner circumferential surface 10*a* of the tube shaped part 10 of the pin 1 and urges the tube shaped part 10, i.e. the webs 13, outwards in the radial direction R so that the clamping force between the first and second contact surfaces 1*a*, 2*a* is increased. Instead of the open sleeve 3B there could be employed any other securing part 3 configured to deform in the radial direction R so that the securing part 3, in the second pre-set shape, has an expansion in the radial direction R greater than in the first pre-set shape. For example, an open ring 3A as shown in FIG. 5, a closed sleeve 3B as shown in FIG. 10, a sleeve 3C as shown in FIGS. 7 to 9, or a coil spring 3D as shown in FIG. 2 or 4 could be employed in FIG. 18 instead of the open sleeve 3B.

Figure 20:
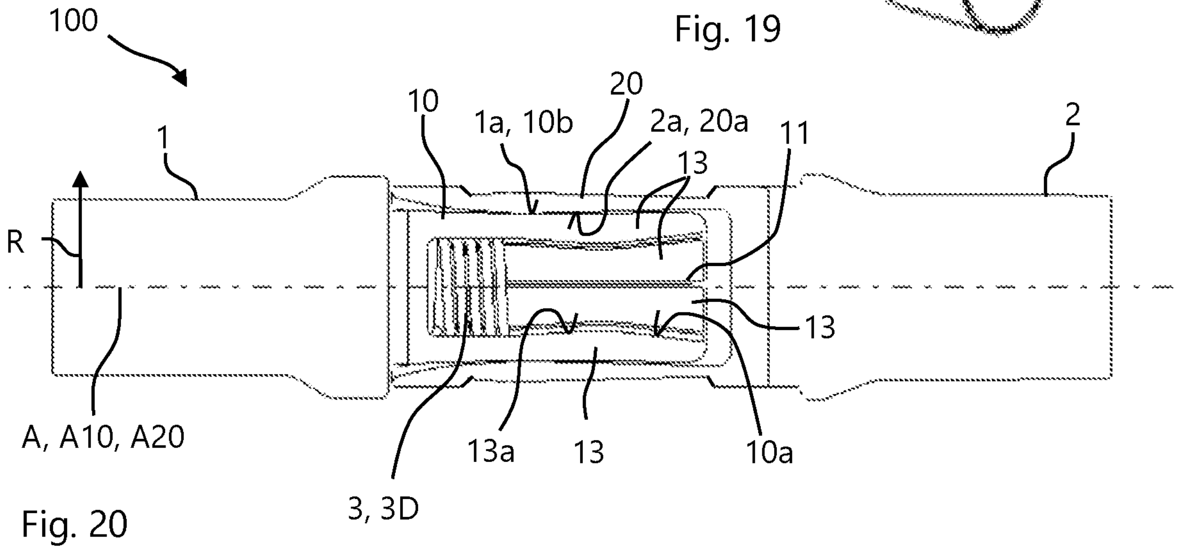
FIG. 20 schematically illustrates a cross-sectional view of an electrical connector according to a further embodiment of the disclosure herein, wherein a securing part is shown to assume a first pre-set shape.
Figure 21:
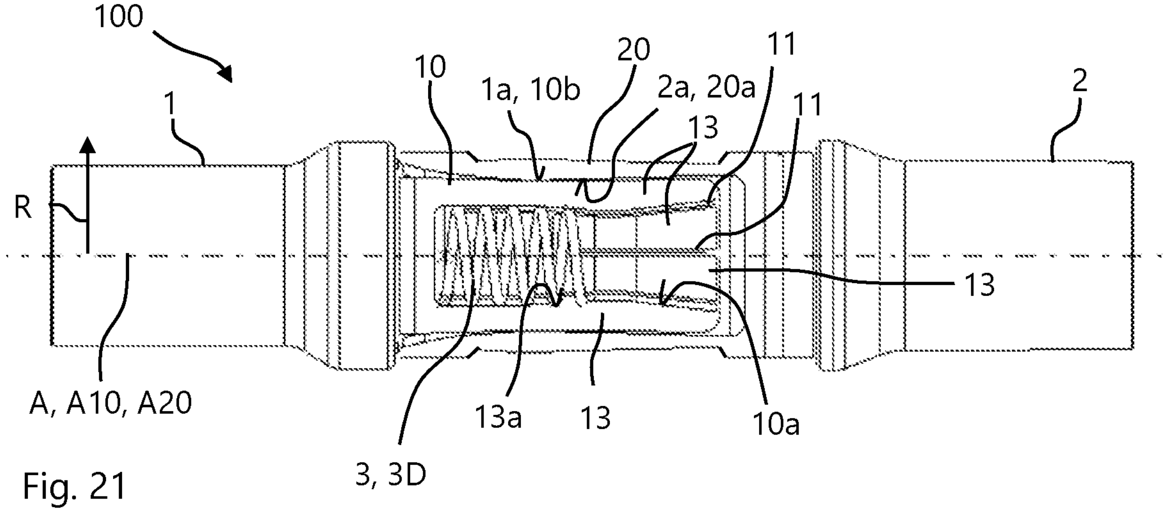
FIG. 21 schematically illustrates the electrical connector according of FIG. 20, wherein the securing part is shown to assume the second pre-set shape.

Also in the case where the securing part 3 is positioned within an inner space defined by the inner circumferential surface 10*a* of the tube shaped part 10 of the pin, the disclosure herein is not limited to a securing part that is configured to deform in the radial direction R. Alternatively, the securing part 3 may be configured to deform parallel to the pin central axis A10 as will be explained by reference to FIGS. 20 and 21. As shown in FIGS. 20 and 21, the webs 13 that space the cut outs 11 may form first surface sections 13*a* that are part of the inner circumferential surface 10*a* of the tube shaped part 10. In the first surface sections 13*a*, the inner circumferential surface 10*a* of the tube shaped part 10 extends inclined relative to the central axis A10. In particular, the first surface sections 13*a* may define a slope or tapered shape. The securing part 3 may, for example, be realized by a coil spring 3D, as exemplarily shown in FIGS. 20 and 21, or by a ring 3H having a plurality of curved slits 35 (FIGS. 14 and 15). FIG. 20 shows the coil spring 3D to assume its first pre-set shape. FIG. 21 shows the coil spring 3D to assume its second pre-set shape. As visible from FIGS. 20 and 21, the securing part 3, in the second pre-set shape, has a greater axial length and a greater overlap with the first surface sections 13*a* than in the first pre-set shape. Thereby, the webs 13 of the tube shaped part 10 of the pin 1 are urged outwards in the radial direction R so that the clamping force between the contact surfaces 1*a*, 2*a* is increased.

It should be noted that positioning the securing part 3 within the inner space of the tube shaped part 10 of the pin 1, as shown in FIGS. 18, 20 and 21, and positioning the securing part 3 on the outer circumference of the tube shaped part 20 of the socket 2 or the pin 1, as exemplarily shown in FIGS. 2 to 17 are not mutually excluding alternatives. For example, a first securing part 3 may be provided within the inner space of the tube shaped part 10 of the pin 1 and, additionally, a second securing part 3 may be provided on the outer circumference of the tube shaped part 20 of the socket 2 or the pin 1.

Figure 22:
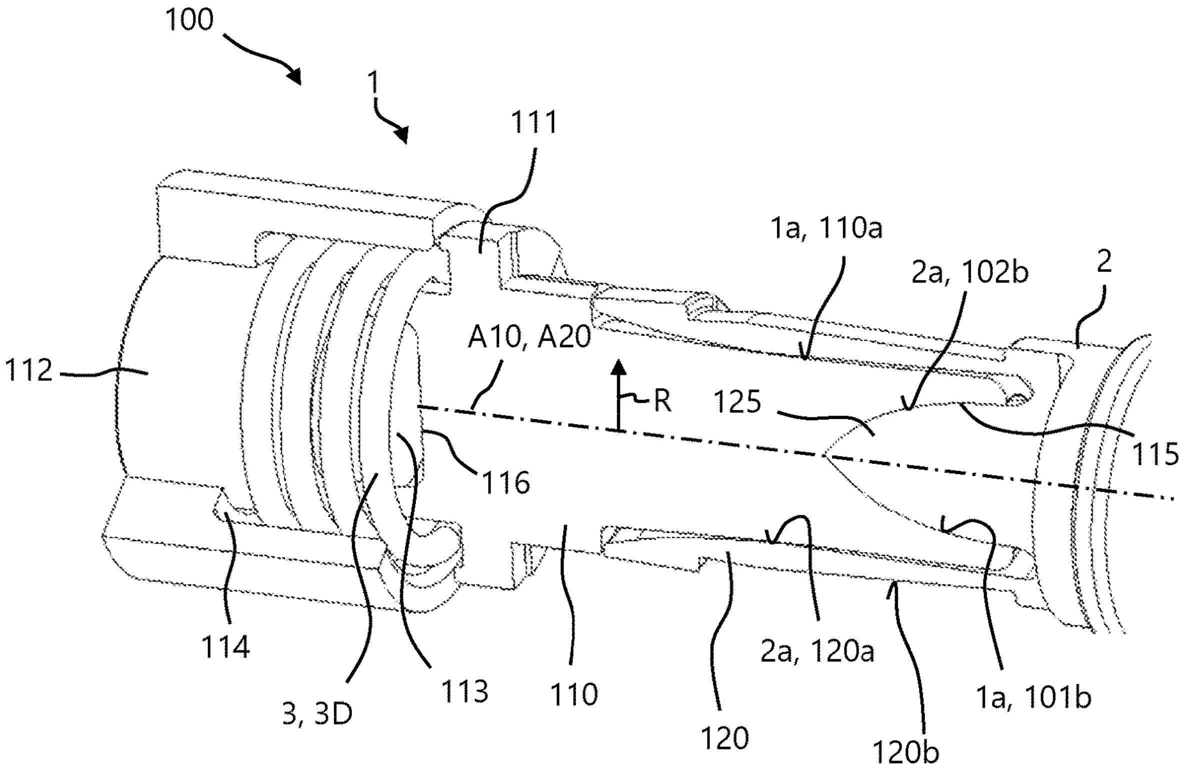
FIG. 22 schematically illustrates a cross-sectional view of an electrical connector according to a further embodiment of the disclosure herein.

FIG. 22 shows a further electrical connector 100 including the pin 1, the socket 2 and the securing part 3. As described above, the socket 2 may include a tube shaped part 120 configured as described above with an inner circumferential surface 120*a* and an opposite outer circumferential surface 120*b*, wherein, optionally, at least one cut out (not shown in FIG. 22) is provided that extends along the socket central axis A20. The inner circumferential surface 120*b* partly forms the second contact surface 2*a* of the socket 2. Further, the socket 2 includes a dome 125 arranged coaxially to the socket central axis A20 within the interior space or recess defined by the inner circumferential surface 120*a* of the tube shaped part 120 of the socket 1. The dome 125 defines an outer surface section 102*b* that forms part of the second contact surface 2*a* of the socket 2.

As further shown in FIG. 22, the pin 1 includes a guide part 112 and a contact part 110. The contact part 110 is generally cylindrical or pin shaped and has an outer circumferential surface 110*a* that forms part of the first contact surface 1*a*. At its tip end, the contact part 110 includes a recess 115 that is complementary formed to the dome 125. The surface defining the recess 115 forms an inner surface section 101*b* that forms part of the first contact surface 1*a* of the pin 1. Alternatively to the configuration shown in FIG. 22, it would also be possible that the contact part 110 forms a protruding outer surface section and the socket 2 includes a recessed inner surface section complementary to the outer surface section. Thus, generally, the contact surface 1*a*, 2*a* of the pin 1 or the socket 2 includes an inner surface section 101*b*, and the contact surface 1*a*, 2*a* of the other one of the pin 1 and the socket (2) includes an outer surface section 102*b*, wherein the inner surface section 101*b* extends tapered and forms a recess arranged coaxially to the pin central axis A10 when the pin (1) is received in the socket 2, and the outer surface section 102*b* is formed complementary to the inner surface section 101*b* so that the recess is configured to receive the outer surface section 102*b*.

As is further shown in FIG. 22, the guide part 112 may generally block shaped and, for example, may comprise a guiding protrusion 113 protruding into a corresponding guiding recess 116 of the contact part 110. Generally, the contact part 110 is coupled to the guide part 112 so as to be movable relative to the guide part 11) along the pin central axis A10.

The securing part 3 may, for example, be realized by a coil spring 3D as shown in FIG. 22. It would also be possible to employ the ring 3H of FIGS. 14 and 15 instead of the coil spring 3D. Generally, the securing part 3 is configured to deform parallel to the pin central axis A10 so that the securing part 3, in the second pre-set shape, has a greater axial length than in the first pre-set shape. As shown in FIG. 22, the securing part 3 is positioned between the guide part 112 and the contact part 110. For example, the securing part 3 may rest against a rim 114 radially protruding from the guide part 112 and against a rim 111 radially protruding from the contact part 110. Thus, in the second pre-set shape, the securing part 3 urges the inner and outer surface sections 101*b*, 102*b* further against each other to increase the clamping force. That is, the securing part 3 is not limited to apply a contact force in the radial direction R but may also apply a contact force in an axial direction.

Figure 23:
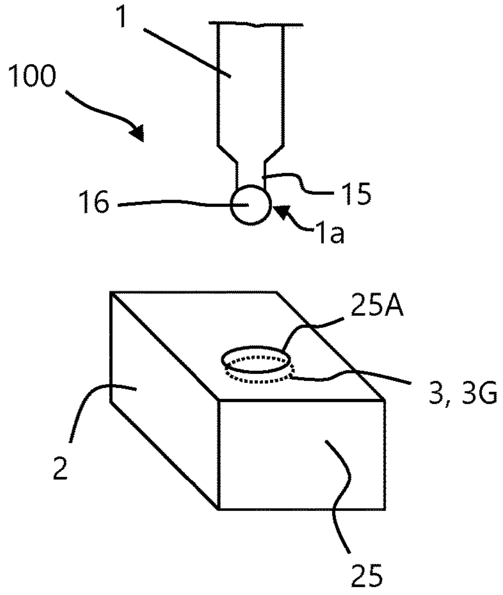
FIG. 23 schematically illustrates an exploded view of an electrical connector according to a further embodiment of the disclosure herein FIG. 24 schematically illustrates a securing part formed by a canted coil spring.

FIG. 23 shows a further connector 100 in which the pin 1 includes a shaft 15 and a head 16 having a greater outer diameter than the shaft 15. The head 16, for example, may be spherical. The shaft 15, for example, may be circular or cylindrical. The head 16 and/or the shaft 15 may form or include the first contact surface 1*a*.

Figure 24:
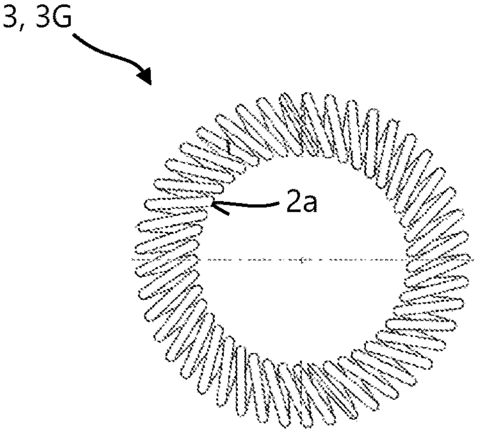

As is further shown in FIG. 23, the socket 2 may be realized by a housing 25 or similar. Generally, the socket 2 includes or defines an inner space having an opening 25A to receive the head 16 of the pin 1. The securing part 3, in this case, may be realized by a canted coil spring 3G as shown in FIG. 24. The canted coil spring 3G may be positioned within the inner space such that it surrounds the opening 25A. Optionally, the canted coil spring 3G forms part of the second contact surface 2*a* of the socket 2. Further, the socket 2 may include a contact structure (not shown) configured to receive the head 16 and having a surface that contacts the surface of the head 16 when the pin 1 is received in the socket 2. When the pin 1 is received within the opening 25A, the canted coil sprint 3G surrounds the shaft 15 of the pin 1. In the second pre-set shape, the spring 3G defines an inner diameter that is smaller than in the first pre-set shape. Thereby, the first and second contact surface 1*a*, 2*a* are urged in closer contact, e.g. by increased clamping force between shaft 15 and spring 3G and/or by axially urging the head 16 onto the contact structure of the bottom of the socket 2 due to the spherical shape of the head 16.

Figure 25:
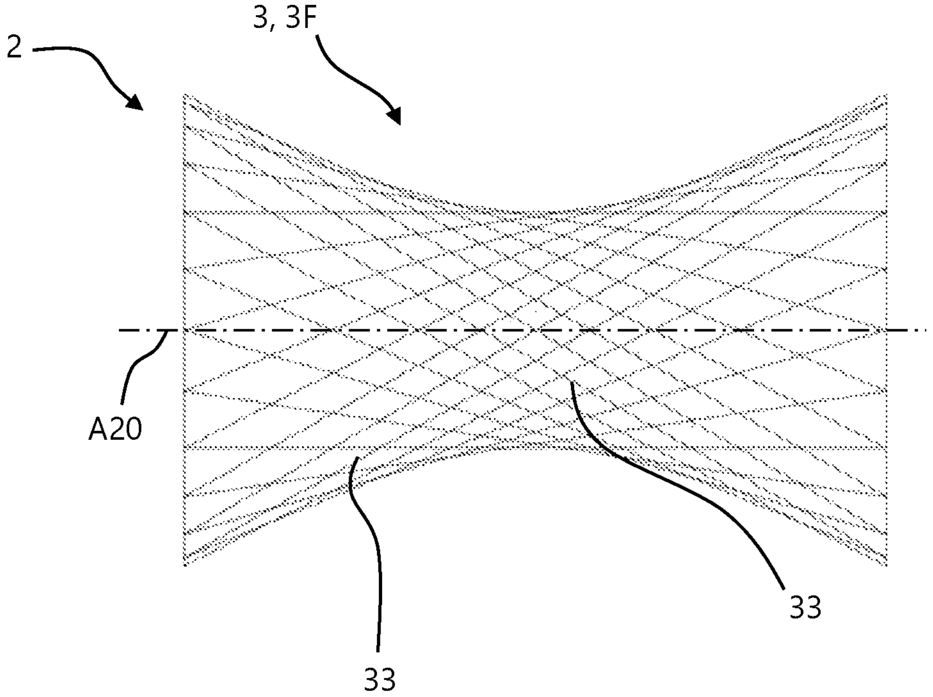
FIG. 25 schematically illustrates a socket of an electrical connector according to a further embodiment of the disclosure herein.

Generally, the securing part 3 may itself form part of the first or the second contact surface 1*a*, 2*a*. That is, the pin 1 or the socket 2 may be at least partially formed from a shape memory alloy that is configured to assume the first and the second pre-set shape as explained above. FIG. 25, by way of example, shows a socket 2 for the connector 100, where the socket 2 is formed by a securing part 3 in the form of a sleeve 3F that is configured to receive the pin 1 therein. The shape memory alloy of the sleeve 3F is trained such that an inner diameter of the sleeve 3F, in the second pre-set shape, is smaller than in the first pre-set shape, so that increase the clamping force applied to the pin 1 is increased in the second pre-set shape. As shown in FIG. 25, the securing part 3 forming the socket 2 may include a plurality of spaced wires 33 that commonly form the sleeve 3F. The surface 3F of each wire 33 forms part of the second contact surface 2*a*. As shown in FIG. 25, the wires 33 may optionally define a hyperboloid. Of course other hollow shapes are possible, too.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the seat modules and aircraft infrastructure can be applied accordingly to the aircraft or spacecraft according to the disclosure herein and the method according to the disclosure herein, and vice versa.

The embodiments were chosen and described in order to best explain the principles of the disclosure herein and its practical applications, to thereby enable others skilled in the art to best utilize the disclosure herein and various embodiments with various modifications as are suited to the particular use con-templated.

While at least one example embodiment of the invention (s) herein is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

1*a* first contact surface
2 socket
2*a* second contact surface
3 securing part
3A open ring
3B sleeve
3C sleeve
3D coil spring
3F sleeve
3G canted coil spring
3H ring
10 tube shaped part of the pin
10*a* inner circumferential surface
10*b* outer circumferential surface
10E free end
16 head
20 tube shaped part of the socket
20*a* inner circumferential surface
20*b* outer circumferential surface
20E free end

21 cut out
23 webs
**23*a*** first surface sections
24 holding channel
25 housing
30 sleeve body
30A axial end of the sleeve body
31 fingers
33 wires
100 electrical connector
**101*b*** inner surface section
**102*b*** outer surface section
113 guiding pin of the guide part
114 rim of the guide part
115 recess
116 guiding recess of the contact part
120 tube shaped part of the socket
**120*a*** inner circumferential surface
**120*b*** outer circumferential surface
200 aircraft
205 electrical voltage source
210 electrical consumer
215 fan
221 first electrical conductor
222 second electrical conductor
A connector central axis
A10 pin central axis
A20 socket central axis
R radial direction

The invention claimed is:

1. An electrical connector for connecting electrical conductors in an aircraft, the electrical connector comprising:
- a pin having a first contact surface and a tube shaped part comprising:
  - an inner circumferential surface;
  - an outer circumferential surface oriented opposite to the inner circumferential surface and forming, at least partially, the first contact surface; and
  - at least one cut out extending along a central axis of the tube shaped part of the pin and connecting the inner circumferential surface and the outer circumferential surface;
- a socket configured to receive the pin, the socket having a second contact surface that is in contact with the first contact surface of the pin when the pin is in the socket; and
- a securing part made of a shape memory alloy configured to exist in a martensite phase and an austenite phase depending on a temperature of the securing part:
- wherein the securing part has a first pre-set shape when the temperature of the securing part is below a first temperature threshold;
- wherein the securing part has a second pre-set shape when the temperature of the securing part is above a second temperature threshold, which is higher than the first temperature threshold;
- wherein the securing part is positioned such that, at least when in the second pre-set shape, the securing part applies a contact force or a clamping force that presses the first contact surface and the second contact surface against each other when the pin is in the socket;
- wherein the contact force or the clamping force applied by the securing part, when in the second pre-set shape, is greater than when the securing part is in the first pre-set shape; and
- wherein the securing part is positioned within an inner space defined by the inner circumferential surface and, at least when in the second pre-set shape, is in contact with the inner circumferential surface.

2. The electrical connector of claim 1, wherein:
- the first temperature threshold corresponds to a martensite start temperature of the shape memory alloy; and
- the second temperature threshold corresponds to an austenite finish temperature of the shape memory alloy.

3. The electrical connector of claim 1, wherein:
- the first temperature threshold is within a range between 50° C. to 80° C.; and the second temperature range is within a range between 95° C. to 120° C.

4. The electrical connector of claim 1, wherein the shape memory alloy is a NiTi alloy, a NiTiCu, or a NiTiHf alloy.

5. The electrical connector of claim 1, wherein:
- the socket comprises:
  - a tube shaped part having an inner circumferential surface that at least partially forms the second contact surface; and
  - at least one cut out extending along a central axis and connecting the inner circumferential surface and an outer circumferential surface of the tube shaped part, the outer circumferential surface being opposite the inner circumferential surface;
- the securing part is positioned:
  - on the outer circumferential surface of the tube shaped part and partially or completely surrounds the tube shaped part: or
  - on an outer circumference of the pin; and
- the securing part, at least when in the second pre-set shape, is in contact with the outer circumferential surface of the tube shaped part.

6. The electrical connector of claim 5, wherein
- the securing part is configured to deform in a radial direction, which is perpendicular to the central axis, so that the securing part, when in the second pre-set shape, has an expansion in the radial direction that is smaller than when the securing part is in the first pre-set shape, so as to press the tube shaped part inwards in the radial direction to increase the contact force.

7. The electrical connector of claim 1, wherein
- the securing part is configured to deform in a radial direction, which is perpendicular to the central axis, so that the securing part, when in the second pre-set shape, has an expansion in the radial direction that is greater than when the securing part is in the first pre-set shape to increase the contact force.

8. The electrical connector of claim 5, wherein
- the securing part is configured to deform in the radial direction and is in a form of:
- an open ring, an open sleeve, or a closed sleeve having a different diameter in the first pre-set shape than in the second pre-set shape;
- a sleeve including a sleeve body and multiple fingers that extend from an axial end of the sleeve body and are configured to assume different radial positions in the first pre-set shape than in the second pre-set shape; or
- a coil spring that has a different diameter in the first pre-set shape than in the second pre-set shape.

9. The electrical connector of claim 5, wherein:
- the first contact surface of the pin defines a double cone; and
- the second contact surface of the socket has a complementary shape.

10. The electrical connector of claim 1, wherein:
- the pin comprises:
  - a guide part; and a contact part that includes the first contact surface and is coupled to the guide part to be movable relative to the guide part along a central axis of the pin;

the contact surface of the pin or the socket includes an inner surface section, and the contact surface of the other one of the pin and the socket includes an outer surface section;

the inner surface section extends tapered and forms a recess arranged coaxially to the central axis of the pin when the pin is in the socket;

the outer surface section is formed complementary to the inner surface section, so the recess is configured to receive the outer surface section;

the securing part is positioned between the guide part and the contact part of the pin and is configured to deform parallel to the central axis, so the securing part, in the second pre-set shape, has a greater axial length than in the first pre-set shape to urge the inner surface section and the outer surface section against each other to increase the clamping force.

11. The electrical connector of claim 1, wherein the securing part at least partially forms the first contact surface or the second contact surface.

12. The electrical connector of claim 11, wherein:

the socket includes a sleeve for receiving the pin therein formed by the securing part; and an inner diameter of the sleeve, in the second pre-set shape, is smaller than in the first pre-set shape to increase the clamping force.

13. The electrical connector of claim 12, wherein:

the securing part includes a plurality of spaced wires that commonly form the sleeve; and the wires preferably define a hyperboloid.

14. The electrical connector of claim 1, wherein;

the pin comprises:

a shaft; and a head having a greater outer diameter than the shaft;

the socket includes an inner space having an opening to receive the head; and, the securing part comprises a canted coil spring, which, when the pin is in the opening, surrounds the shaft of the pin, and, when in the second pre-set shape, defines a smaller inner diameter than when in the first pre-set shape.

15. An aircraft comprising:

the electrical connector of claim 1;

a first electrical conductor electrically connected to the first contact surface of the pin; and a second electrical conductor electrically connected to the second contact surface of the socket.

16. The electrical connector of claim 5, wherein:

the tube shaped part includes multiple cut outs that are distanced from each other in a circumferential direction by webs that form first surface sections, in which the outer circumferential surface of the tube shaped part extends inclined relative to the central axis; and the securing part is configured to deform parallel to the central axis so the securing part, when in the second pre-set shape, has a greater axial length and a greater overlap with the first surface sections than when the securing device is in the first pre-set shape, so as to urge the webs inwards in a radial direction to increase the clamping force.

17. The electrical connector of claim 7, wherein:

the tube shaped part includes multiple cut outs that are distanced from each other in a circumferential direction by webs that form first surface sections, in which the inner circumferential surface of the tube shaped part extends inclined relative to the central axis; and the securing part is configured to deform parallel to the central axis so the securing part, when in the second pre-set shape, has a greater axial length and a greater overlap with the first surface sections than when the securing device is in the first pre-set shape, so as to urge the webs outwards in a radial direction to increase the clamping force.

18. The electrical connector of claim 5, wherein the securing part is configured to deform parallel to the central axis and is in a form of:

a coil spring that, in the second pre-set shape, has a greater axial length than in the first pre-set shape; or a ring that has:

a plurality of curved slits; and in the second pre-set shape, a greater axial length than in the first pre-set shape.

19. An electrical connector for connecting electrical conductors in an aircraft, the electrical connector comprising:

a pin having a first contact surface;

a socket configured to receive the pin, the socket having a second contact surface that is in contact with the first contact surface of the pin when the pin is in the socket; and a securing part made of a shape memory alloy configured to exist in a martensite phase and an austenite phase depending on a temperature of the securing part;

wherein the securing part has a first pre-set shape when the temperature of the securing part is below a first temperature threshold;

wherein the securing part has a second pre-set shape when the temperature of the securing part is above a second temperature threshold, which is higher than the first temperature threshold;

wherein the securing part is positioned such that, at least when in the second pre-set shape, the securing part applies a contact force or a clamping force that presses the first contact surface and the second contact surface against each other when the pin is in the socket;

wherein the contact force or the clamping force applied by the securing part, when in the second pre-set shape, is greater than when the securing part is in the first pre-set shape; and wherein either:

the pin comprises:

a guide part; and a contact part that includes the first contact surface and is coupled to the guide part to be movable relative to the guide part along a central axis of the pin;

the contact surface of the pin or the socket includes an inner surface section, and the contact surface of the other one of the pin and the socket includes an outer surface section;

the inner surface section extends tapered and forms a recess arranged coaxially to the central axis of the pin when the pin is in the socket;

the outer surface section is formed complementary to the inner surface section, so the recess is configured to receive the outer surface section; and the securing part is positioned between the guide part and the contact part of the pin and is configured to deform parallel to the central axis, so the securing part, in the second pre-set shape, has a greater axial length than in the first pre-set shape to urge the inner surface section and the outer surface section against each other to increase the clamping force; or:

the pin comprises:

a shaft; and a head having a greater outer diameter than the shaft;

the socket includes an inner space having an opening to receive the head; and the securing part comprises a canted coil spring, which, when the pin is in the opening, surrounds the shaft of the pin, and, when in the second pre-set shape, defines a smaller inner diameter than when in the first pre-set shape.

20. An electrical connector for connecting electrical conductors in an aircraft, the electrical connector comprising:

a pin having a first contact surface;

a socket configured to receive the pin, the socket having a second contact surface that is in contact with the first contact surface of the pin when the pin is in the socket; and a securing part made of a shape memory alloy configured to exist in a martensite phase and an austenite phase depending on a temperature of the securing part;

wherein the securing part has a first pre-set shape when the temperature of the securing part is below a first temperature threshold;

wherein the securing part has a second pre-set shape when the temperature of the securing part is above a second temperature threshold, which is higher than the first temperature threshold;

wherein the securing part is positioned such that, at least when in the second pre-set shape, the securing part applies a contact force or a clamping force that presses the first contact surface and the second contact surface against each other when the pin is in the socket;

wherein the contact force or the clamping force applied by the securing part, when in the second pre-set shape, is greater than when the securing part is in the first pre-set shape; and wherein the securing part at least partially forms the first contact surface or the second contact surface.

* * * * *